(12) United States Patent
Kroll et al.

(10) Patent No.: US 8,169,682 B2
(45) Date of Patent: May 1, 2012

(54) LIGHT MODULATOR FOR REPRESENTING COMPLEX-VALUED DATA

(75) Inventors: Bo Kroll, London (GB); Armin Schwerdtner, Dresden (DE); Norbert Leister, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 44 days.

(21) Appl. No.: 12/598,232

(22) PCT Filed: Apr. 29, 2008

(86) PCT No.: PCT/EP2008/055211
§ 371 (c)(1),
(2), (4) Date: Feb. 24, 2010

(87) PCT Pub. No.: WO2008/132206
PCT Pub. Date: Nov. 6, 2008

(65) Prior Publication Data
US 2010/0149617 A1  Jun. 17, 2010

(30) Foreign Application Priority Data
Apr. 30, 2007  (DE) .................... 10 2007 021 774

(51) Int. Cl.
*G02F 1/07* (2006.01)
(52) U.S. Cl. ........................................... 359/249
(58) Field of Classification Search .................. 359/249, 359/290, 291, 293, 295, 220, 223, 224, 256
See application file for complete search history.

(56) References Cited

U.S. PATENT DOCUMENTS 5,416,618 A    5/1995 Juday
5,796,509 A *  8/1998 Doany et al. .................. 359/254
6,707,516 B1 * 3/2004 Johnson et al. ................. 349/78

FOREIGN PATENT DOCUMENTS

| EP | 1 452 892 | 9/2004 |
|---|---|---|
| JP | 2001-194626 | 7/2001 |
| WO | WO 96/10771 | 4/1996 |
| WO | WO 2005/059659 | 6/2005 |
| WO | WO 2005/096084 | 10/2005 |

OTHER PUBLICATIONS

Arrizon, V., "Complex modulation with a twisted-nematic liquid-crystal spatial light modulator: double-pixel approach," Optics Letters, OSA, Optical Society of America, Washington, DC, US, vol. 28, No. 15, Aug. 1, 2003, pp. 1359-1361.
International Search Report, dated Sep. 15, 2008, issued in priority International Application No. PCT/EP2008/055211 (in both German and English).

* cited by examiner

*Primary Examiner* — Ricky Mack
*Assistant Examiner* — Tuyen Tra
(74) *Attorney, Agent, or Firm* — Saul Ewing LLP (57) ABSTRACT

A light modulator is disclosed for representing complex-valued data, comprising an encoding area that has an arrangement of pixels, the phase of which can be controlled. This largely avoids an interfering optical path difference between adjacent pixels or pixel groups when a complex value is encoded in several adjacent phase pixels of the encoding area, the optical path difference varying according to the angle. One respective specific structured delaying layer, which causes the optical path of an incident linearly polarized beam to change according to the angle, is associated with at least one predefined pixel of a group of adjacent pixels of the encoding area. The thickness of the delaying layer is designed such that the modification of the optical path caused by the delaying layer runs in the opposite direction from the angle-related modification of the optical path difference between individual pixels of the pixel group.

24 Claims, 6 Drawing Sheets

LIGHT MODULATOR FOR REPRESENTING COMPLEX-VALUED DATA

CROSS REFERENCE TO RELATED APPLICATIONS

This application claims the priority of PCT/EP2008/055211, filed on Apr. 29, 2008, which claims priority to German Application No. 10 2007 021774.0, filed Apr. 30, 2007, the entire contents of which are hereby incorporated in total by reference.

BACKGROUND OF THE INVENTION

The present invention relates to a light modulator for representing complex-valued information, comprising an encoding surface with an arrangement of pixels whose transmissive or reflective phase shift is controllable.

The computation of computer-generated holograms and similar diffractive structures for encoding on pixelated light modulators generally provides complex-valued information, i.e. numbers, with a real part and an imaginary part, said information being written in the form of amplitude or phase information to the light modulator with a discrete pixel structure and being reconstructed with the help of sufficiently coherent illumination.

The light modulators typically only allow the amplitude or phase information to be written to a pixel, but disallow the entire complex number, i.e. any combination of amplitude and phase information to be written simultaneously.

Known methods to solve this problem, as for example described in document U.S. Pat. No. 5,416,618, use either a combination of multiple light modulators, for example an amplitude-modulating light modulator and a phase-modulating light modulator, or two amplitude-modulating or phase-modulating light modulators so to be able to represent a complex number in each pixel. However, this has the disadvantage that a difficult adjustment is required because the pixel structure of the two light modulators must be congruent.

This disadvantage will be irrelevant if a complex number is represented by a group of multiple pixels on the same light modulator. However, this involves complicated encoding methods which are associated with an iterative computation of the complex-valued code.

One possibility of applying these encoding methods is to use multiple phase values, in particular to use a two-phase encoding method. A complex number here is represented by a sum of two numbers with same absolute value and different phase values and is written to two adjacent pixels of the same light modulator.

The interference of coherent light which passes through both pixels then shows the same effect as light which passed through a single complex-valued pixel. However, this only applies if there is no further optical retardation except the computed one of the light beams between the two pixels.

However, on the one hand, if light is diffracted at the adjacent pixels of a pixel group then an angle-specific optical retardation occurs, which causes errors in the hologram reconstruction.

On the other hand, the angle-specific optical retardation between a group of pixels which represents a complex number, relative to adjacent groups of pixels which represent other complex numbers, is essential for hologram reconstruction, because this is what represents the principle of diffraction, on which the hologram reconstruction is based.

Document DE 10 2006 003 741.3 describes for a two-phase encoding method a modification of the hologram computation with the help of an iterative method, whereby an improvement of the reconstruction is achieved. However, this causes an increased computational load, which is for example disturbing in a real-time computation of holograms.

Due to pixel dimensions of conventional light modulators, another problem in display holography is the very small useable diffraction angle, which greatly limits either the extent or the visibility region of a holographically reconstructed scene. Now, if multiple adjacent pixels are used for encoding complex hologram values, the diffraction angle will be further reduced. This disadvantage is not compensated by avoiding the vertical parallax to be encoded, i.e. if only the horizontal parallax is holographically encoded.

Document U.S. Pat. No. 3,633,989, for example, describes a method of display holography involving one-dimensionally encoded holograms, where a hologram is for example only encoded horizontally (horizontal-parallax-only holograms—HPO). Values for the hologram are computed independently of each other and are typically written to individual rows of a light modulator.

A specific device for reconstructing one-dimensional holograms is created when using a light modulator with a one-dimensional arrangement of pixels. A spatial scene can then for example be reconstructed in that individual rows of a hologram are displayed sequentially on the light modulator and are strung together in the vertical direction in combination with a scanning unit.

If an HPO encoding method and a light modulator with a two-dimensional arrangement of pixels are used, and if there are no mutually independent values which are written to each row of the light modulator, but always groups of multiple rows, there will be the possibility to widen the usable horizontal diffraction angle at the cost of a loss of vertical resolution. A particular possibility is the coherent combination of multiple hologram rows. With a two-phase encoding method, the two phase values can for example be written to two adjacent rows of the light modulator. However, a coherent illumination of the respective groups of rows will then also be necessary for the reconstruction.

In HPO holograms, a dependence of the hologram reconstruction on the vertical diffraction angle is not desired. However, if a group of rows of a light modulator is coherently illuminated, this will cause in the vertical direction an undesired, angle-specific retardation among the individual rows, while in the horizontal direction the retardation among adjacent columns is required for the reconstruction, because in a phase encoding method it comprises the information about the object to be reconstructed.

In either case, for the phase encoding method with multiple pixels for representing a complex number, and for the coherent combination of multiple HPO-encoded light modulator rows, the same problem occurs: on the one hand, a disturbing, angle-specific optical retardation occurs between the groups of few adjacent pixels, while on the other hand the optical retardation to other pixels or pixel groups, which is likewise generated, is either insignificant or even required for the hologram reconstruction.

SUMMARY OF THE INVENTION

It is therefore the object of the present invention to provide a light modulator for representing complex-valued information, which is designed such that a disturbing, angle-specific optical retardation among adjacent pixels or pixel groups is widely prevented.

The object is solved with the help of the features of claim 1.

The light modulator for representing complex-valued information comprises an encoding surface with an arrangement of pixels, whose phase can be controlled, where according to the characterising clause of claim 1 at least one given pixel of each pixel group of adjacent pixels of the encoding surface is assigned with a certain structured retardation layer which causes an angle-specific change in the optical path length of an exiting bundle of rays, where the layer thickness of the retardation layer is designed such that the change in the optical path length through the retardation layer counteracts the angle-specific change in the retardation among individual pixels of a pixel group and compensates the angle-specific change in the retardation at least partly or even entirely.

The certain structured retardation layer is disposed near the encoding surface, where the retardation layer can be disposed in front of or behind the encoding surface, preferably in close contact with the pixels.

The pixels can therein be arranged one-dimensionally, i.e. in a stripe-shaped manner, or two-dimensionally, related to the encoding surface.

The encoding surface can be designed either as a flexible or as an inelastic layer.

The encoding surface which comprises the arrangement of the pixels can be in contact with at least one orientation layer which is disposed on either side of the encoding surface.

The encoding surface can be a plane liquid crystal layer.

The encoding surface which comprises the arrangement of the pixels can be assigned to at least one switching element layer which is disposed on either side of the encoding surface for controlling the pixels.

The switching element layer can be an electrode layer.

The encoding surface which comprises the arrangement of the pixels can be in contact with at least one carrier layer.

The encoding surface of the light modulators can alternatively comprise an arrangement of micro-fluidic droplet pixels which can be manipulated by an electric field, where the light modulators are designed in the form of electro-wetting phase-modulating light modulators.

The carrier layer can be designed as a flexible layer, in particular made of plastic, or as an inelastic plastic layer or glass plate.

The retardation layer can be applied between the electrodes and the carrier layer on the inner face of the carrier layer or on the outer face of the carrier layer.

The light modulator can comprise:
An encoding surface which comprises the arrangement of pixels,
Optionally one orientation layer, which is disposed on at least one of the two sides of the encoding surface,
At least one electrode layer for controlling the pixels which is disposed on the two free sides, and
At least one carrier layer which is disposed on at least one of the two free sides, Thus providing a one- or two-dimensional arrangement of pixels on the encoding surface, where the pixels can be controlled with the help of the potentials which are supplied to the electrode layers, and where a structured retardation layer is disposed between at least one of the electrode layers and the carrier layer which is adjacent to the electrode layer.

In this light modulator, structured retardation layers can optionally be disposed on one or either side of the plane encoding surface between the electrode layers and the carrier layers.

For controlling the encoding surface, which is for example a liquid crystal layer or a droplet pixel layer, the electrodes and the orientation layers for controlling and orienting the pixels can be disposed on the side of the retardation layer(s) which face(s) the liquid crystal layer or the droplet pixel layer.

A mask can be disposed between an electrode and the retardation layers on the side through which the light beams are emitted after having passed the pixels, said mask having a structure which prevents the incident light beams having linear polarisation from passing through two retardation layers which are of different nature and which are disposed opposing each other on either side of the encoding surface, if the light is incident at an oblique angle. The corresponding mask apertures are provided at positions where incident light beams having linear polarisation can pass retardation layers of same design in front of and/or behind the encoding surface.

The structural dimensions of the structured retardation layers can widely correspond with the extent of a pixel group which comprises multiple pixels. The pixels of the pixel group are frequently arranged such that the retardation layers have to be structured only in one dimension.

The structured retardation layer will now be described in detail with the help of the example of a pixel group which comprises two pixels. Generally, the structures can also correspond to pixel groups which comprise more than two pixels.

With a two-phase encoding method where two adjacent pixel columns are used in order to encode a complex number in two pixels of each row, the structured retardation layers can for example exhibit a column arrangement with the height of the light modulator and the width which corresponds roughly to the dimension of the pixels.

Each of the structured retardation layers can represent a structured layer of a single material or of a combination of multiple birefringent materials, where because of the use of light beams having linear polarisation only the extraordinary beam passes through the retardation layer, and where the birefringent materials exhibit angle-specific changes in the refractive index and thus cause changes in the optical path length for light transmitted at different angles.

The light modulator is thus preferably combined on its entry side with a linear polariser.

The retardation layer which is disposed behind the pixels causes light beams with an oblique angle of incidence to cover different optical path lengths OW for the angle $\alpha$ through the pixels which are separated by one pixel such that the retardation to the adjacent pixels is compensated partly or even entirely.

The light which is transmitted through the retardation layer is thus given linear polarisation, where the different path length is achieved when only the extraordinary beam passes through the retardation layer, where the linear polarisation can be obtained by using a light source which only emits polarised light, such as a laser, or by disposing a linear polariser on the entry side of the light modulator.

The change in the optical path length OW for the angle $\alpha$ is relative to a given reference angle $\alpha_0$, where the differences in optical path length for this reference angle $\alpha_0$ are compensated by writing modified phase values to the pixels of a group.

The individual retardation layers can be disposed in front of the two adjacent pixels of the groups, where the light of one pixel of the group has a longer optical path length relative to the reference angle $\alpha_0$, and light of the other pixel has a shorter optical path length relative to the reference angle $\alpha_0$, due to different properties of the retardation layers.

Identical birefringent material, but with different orientation of the optical axis, can be used for the adjacent retardation layers, such that in one case the optical path length OW in the one retardation layer increases with the angle $\alpha_n$ and in the other case the optical path length OW in the adjacent retardation layer decreases with the angle $\alpha_n$, or vice versa.

The retardation layers can alternatively be made of different birefringent materials.

In order to reduce the layer thickness d, the retardation layers can be divided into parts which are disposed at different positions, for example into two halves which are disposed on the two planar sides of the encoding surface.

The retardation layers can also be composed of multiple sub-layers which are disposed one above another. These sub-layers can be connected with interface layers, for example adhesive layers. Such a layer stack can for example serve to simplify the manufacturing process.

In their function as retardation layer, each of the sub-layers which are disposed one above another has the effect of a single retardation layer. The general term 'retardation layer' will be used for any of these cases below.

In the example of a liquid crystal modulator, the retardation layers can be disposed in the immediate vicinity of the liquid crystal layer between the glass plates. However, structured retardation layers can generally be used in various types of light modulators, preferably in phase-modulating light modulators.

The light modulator can for example be designed such that the structured retardation layers are provided when using a micro-mirror array, in particular a tip-mirror array for phase modulation, which represents the arrangement of pixels, where the structured retardation layers are alternately applied on adjacent micro-mirrors or columns of micro-mirrors of the micro-mirror array.

BRIEF DESCRIPTION OF THE DRAWINGS

The present invention will be described in more detail below with the help of a number of embodiments and drawings, wherein.

DETAILED DESCRIPTION

Figure 1:
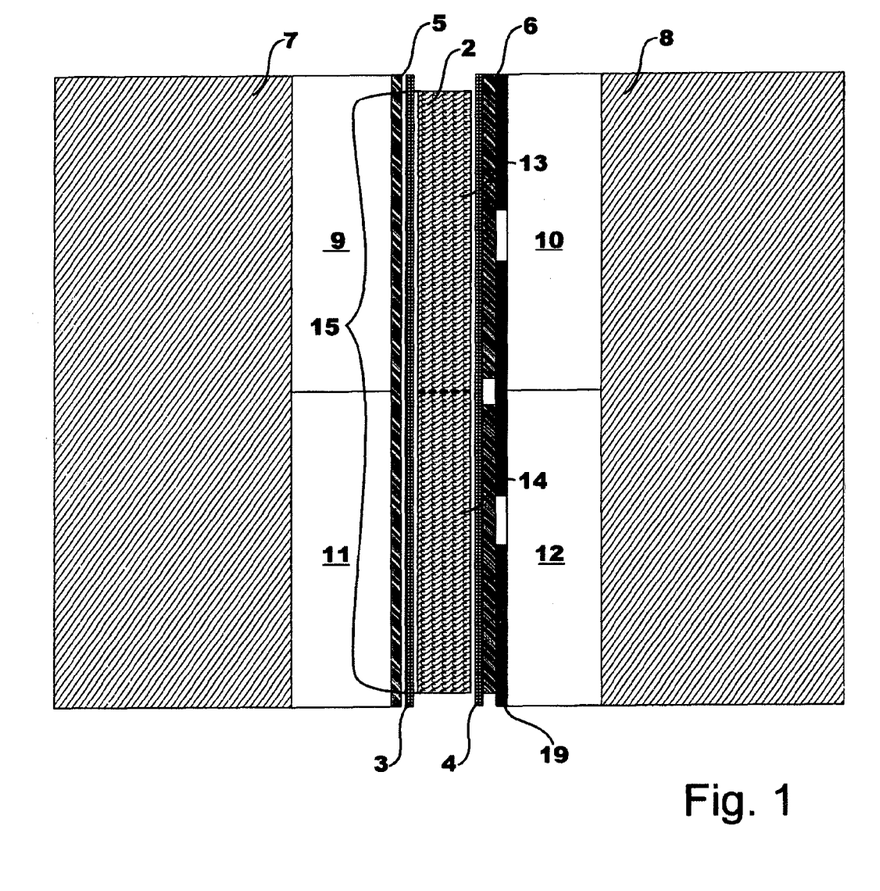
FIG. 1 shows schematically a longitudinal cross-section of a light modulator according to the present invention.

FIG. 1 shows schematically a light modulator 1 according to this invention, comprising:

A liquid crystal layer 2,

An orientation layer 3, 4 which is disposed on the two sides of the liquid crystal layer 2, An electrode layer 5, 6 which is disposed on the two free sides, and A glass plate 7, 8 which is disposed on the two free sides, Thus providing a two-dimensional arrangement of pixels 13, 14, whose transmissive amplitude or phase can be controlled with the help of potentials which are supplied to the electrode layers 5, 6.

According to the present invention, a structured retardation layer 9, 10, 11, 12 is disposed at least between one of the electrode layers 5, 6 and the glass plate 7, 8 which lies opposite the electrode layer 5, 6, said structured retardation layer causing an angle-specific change in the optical path length of an incident bundle of rays having linear polarisation, where the thickness of the retardation layer 9, 10, 11, 12 is dimensioned such that the change in the optical path length through the retardation layer 9, 10, 11, 12 counteracts the angle-specific change in the retardation among individual pixels 13, 14 of a pixel group 15, and compensates the angle-specific change in the retardation 20, 21 at least partly, or even entirely.

A structured retardation layer 9, 11 and 10, 12 can be disposed on either side of the liquid crystal layer 2, between the electrode layers 5, 6 and the glass plates 7, 8.

For controlling the liquid crystal layer 2, the electrodes 5, 6 and the orientation layers 3, 4 for controlling and orientating the liquid crystal pixels 13, 14 are disposed on the retardation layers 9, 11 and 10, 12 on the side facing the liquid crystal layer 2, and not directly on a glass plate 7 or 8, as shown in FIG. 1.

Further, a mask 19 can be disposed between the electrode 6 and the retardation layer 10, 12, said mask having a structure which prevents the light beams from passing the boundary between the retardation layers, e.g. 12, 10, if the light beams are incident at an oblique angle.

The structure width of the structured retardation layer 9, 10, 11, 12 can correspond approximately to the extent of a pixel group 15.

With a two-phase encoding method where two adjacent pixel columns are used in order to encode a complex number in each row, the structured retardation layer 9, 10, 11, 12 can for example exhibit a column arrangement which corresponds roughly to the dimensions of the pixels 13, 14.

The retardation layers 9, 10, 11, 12 can be made of a single birefringent material or a combination of multiple birefringent materials, where the birefringent materials exhibit angle-specific changes in the refractive index and thus changes in the optical path length for light transmitted at different angles.

Figure 2:
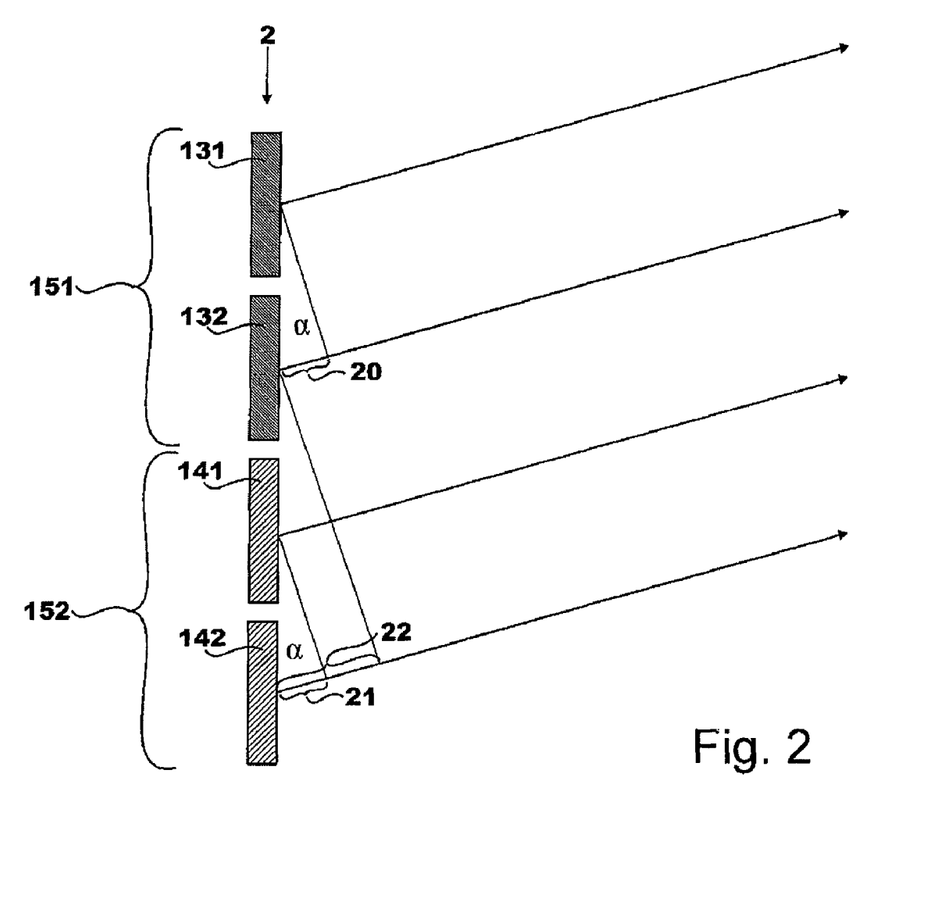
FIG. 2 shows schematically in the vertical direction four adjacent pixels of a conventional light modulator with retardation of the light beams which are emitted by adjacent pixels or pixel groups.

The functional principle of the light modulator 1 according to the present invention will now be described in detail with the help of FIG. 2 to FIG. 9:

FIG. 2 shows schematically four pixels 131, 132, 141, 142 of a conventional light modulator, said pixels being arranged in two pixel groups 151, 152 at two pixels 131, 132; 141, 142 each. The pixels 131, 132 and 141, 142, for example, each represent a complex number of a two-phase encoding. The incident light beams pass through the pixels 131, 132, 141, 142 at an angle α.

After the passage of the light beams, an undesired retardation 20, 21 occurs between the pixel 131 and pixel 132 as well as between the pixel 141 and pixel 142, while the retardation 22 between pixel group 151 relative to pixel group 152 is desired.

Figure 3:
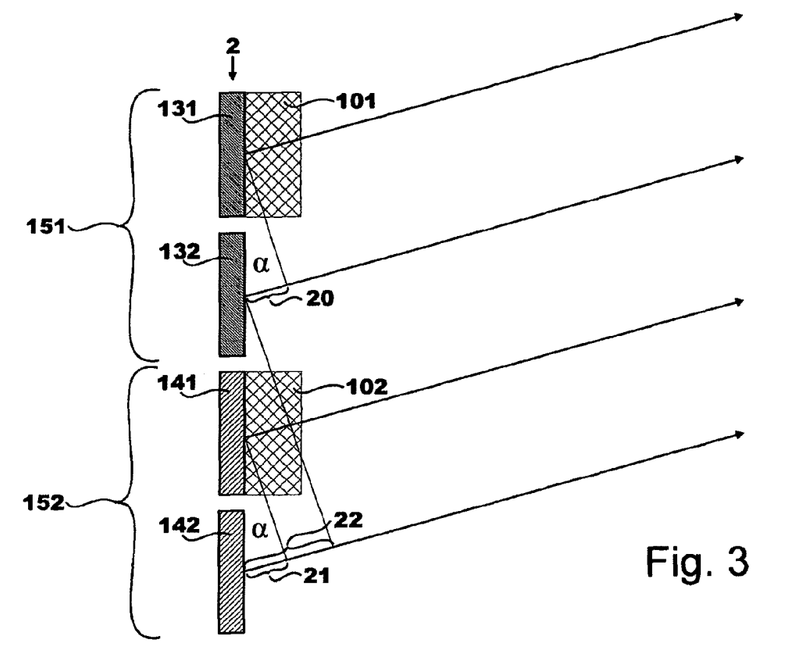
FIG. 3 shows schematically in the vertical direction four adjacent pixels of a light modulator with retardation layers at two pixels for compensating the occurring retardation of the light beams which are emitted by the pixels, where the retardation layers have identical optical properties.

According to the present invention, FIG. 3 shows a retardation layer 101, 102, which is applied on the pixels 131 and 141, respectively, which causes the light beams which pass through the pixels 131 and 141 to cover a longer optical path length OW for the angle α, such that the retardation 20, 21 to pixel 132 or 142, respectively, is compensated partly or even entirely. It is only important to change the optical path length OW for the angle α relative to a given reference angle $α_0$ (not shown). For the reference angle $α_0$, differences in the optical path length can be compensated by writing modified phase values, in this case to one of the two pixels of a group.

It is a practical disadvantage of the pixel arrangement shown in FIG. 3 that retardation layers with different layer thicknesses d are disposed in front of the individual pixels.

Figure 4:
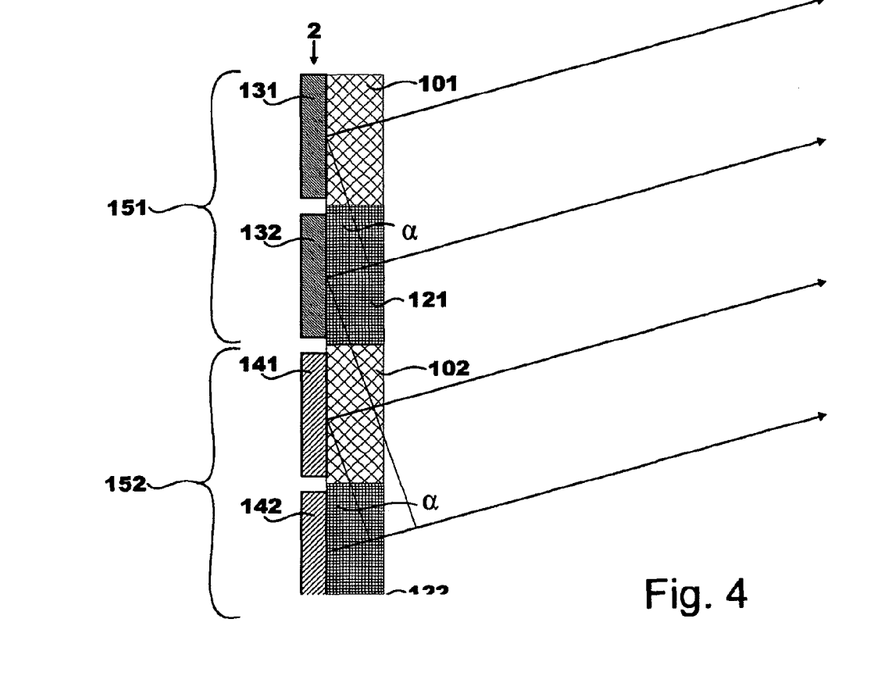
FIG. 4 shows schematically in the vertical direction four adjacent pixels of a light modulator with retardation layers at four pixels for compensating the occurring retardation of the light beams which are emitted by the pixels, where the adjacent retardation layers have different optical properties.

Referring to FIG. 4, a preferred arrangement, in contrast, takes advantage of two different retardation layers 102, 121 and 102, 122 with same layer thicknesses in front of the two pixels 131, 132 and 141, 142 of the groups 151, 152, where the light of pixel 131 covers a longer optical path length OW, relative to the reference angle $α_0$, than the light of pixel 132, which covers a shorter optical path length OW relative to the reference angle $α_0$, because the retardation layers 101, 102 exhibit effective refractive indices which differ from those of the retardation layers 121, 122, for this angle.

Figure 5:
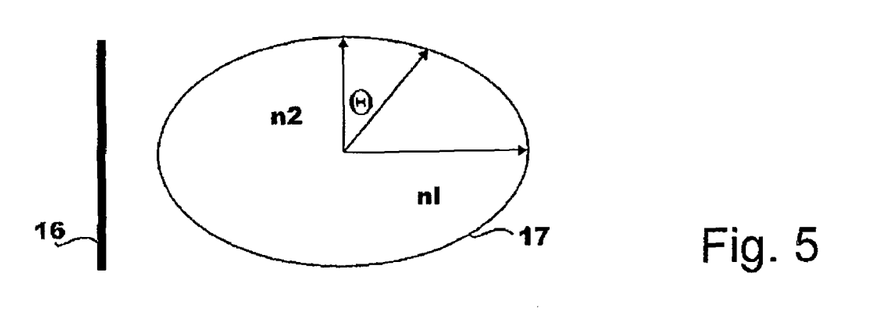
FIG. 5 shows schematically the angular dependence of the refractive index for a birefringent material with the help of a refractive index ellipsoid.

FIG. 5 shows schematically the dependence of the refractive index on the angle of the transmitted light for a birefringent material, if the optical axis 16 runs parallel to the extraordinary refractive index n2.

The angular dependence of the refractive index is described by the following equation:

$$n(\Theta)=n1*n2/sqrt(n1^2 \cos^2\Theta + n2^2 \sin^2\Theta) \quad (I),$$

where n1 is the ordinary refractive index and n2 is the extraordinary refractive index, both being oriented at a right angle to each other, and where Θ represents the angle of a light beam relative to the optical axis 16 of the birefringent material. The two refractive indices n1 and n2 are representative of a refractive index ellipsoid 17.

Figures 6, 6A:
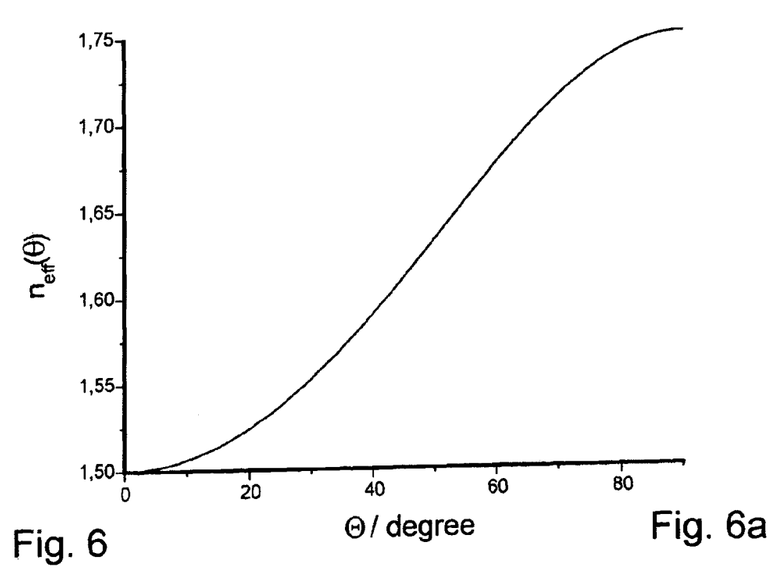
FIG. 6 shows refractive index—angle diagrams for birefringent material, where
FIG. 6*a* shows the refractive index n in dependence on the angle $\Theta$ in relation to the optical axis and FIG. 6*b* shows the refractive index change $\Delta n$ for a small angle change $\Delta\Theta$ in dependence on the angle $\Theta$ in relation to the optical axis.
Figure 6B:
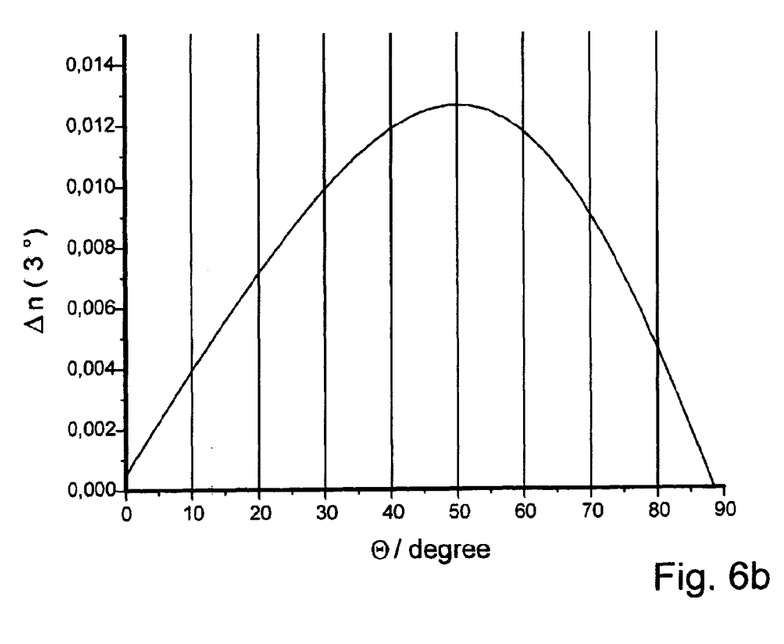

FIGS. 6a and 6b show refractive index—angle diagrams for birefringent material, where FIG. 6a shows the refractive index n in dependence on the angle Θ in relation to the optical axis, and where FIG. 6b shows the refractive index change Δn for a small angle change ΔΘ in dependence on the angle Θ in relation to the optical axis. FIG. 6a illustrates the change in the refractive index n with an angle change as an example for a material with the refractive indices between n1=1.5 and n2=1.75. A maximum change Δn occurs at a certain angle Θ oblique to the optical axis 16, where in the environment of the certain angle Θ the change Δn is approximately linear to the angle Θ.

Figure 7:
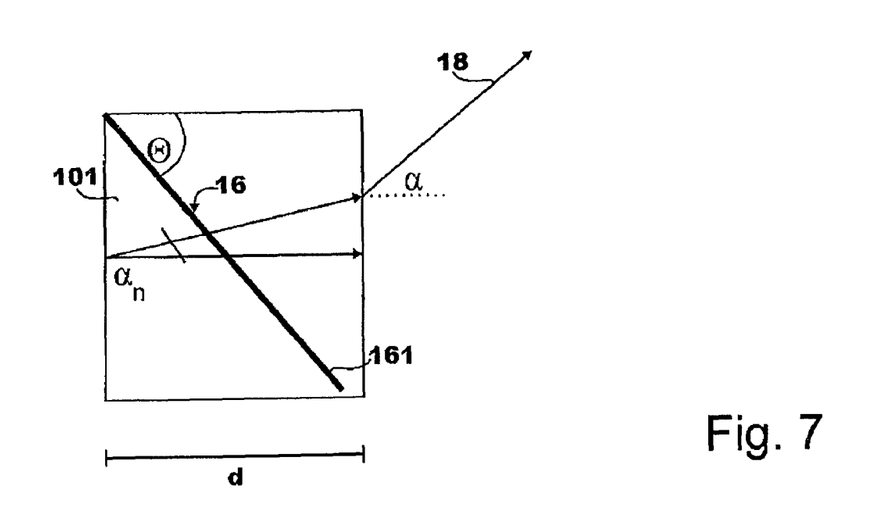
FIG. 7 illustrates the angle change in the birefringent material relative to the angle change in air.

The usage of the angular range Θ approximate to the maximum change is preferable because the layer thickness d of the retardation layer 101, as shown in FIG. 7, which is required for compensating the certain retardation 20, 21, is then reduced. The usage in the region of approximately linear change in the refractive index with the angle Θ is also preferred because the retardation 20, 21, which is to be compensated, changes with the sinus of the angle Θ, and the sinus is also about linear for small angles. The retardation 20, 21 can thus largely be compensated thanks to the similar angle characteristics.

Referring to FIG. 7, when computing the layer thickness d of the retardation layer 101, which is required for the compensation, it is taken into consideration that between the retardation layer 101, which is used for the compensation, and the observer of the light modulator 1 there is a transition of the light beams 18 from an optical material with a refractive index n with n>1 to air, such that the changes in the angle $α_n$ in the retardation layer 101 are related to the external angle changes α, based on which the retardation is computed, trough the law of refraction.

Figure 8:
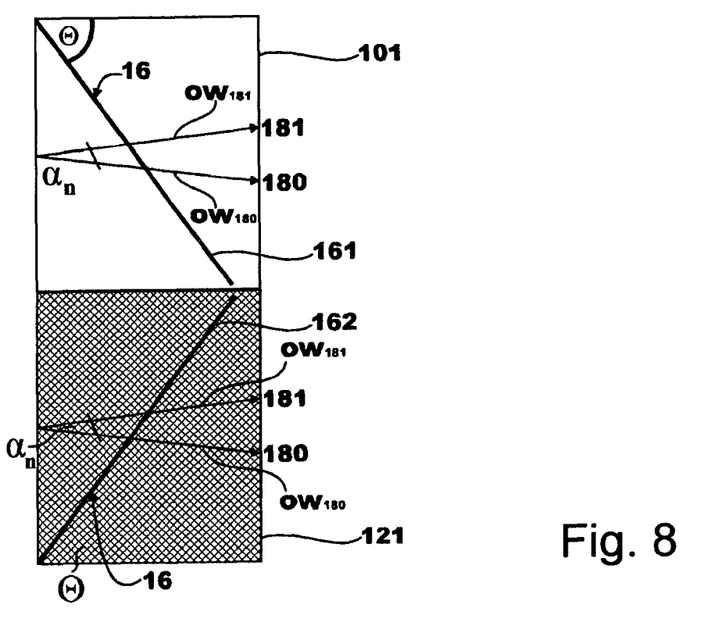
FIG. 8 shows a structured retardation layer made of a birefringent material with different orientation of the optical axis.

Referring to FIG. 8, if the identical birefringent material is used, but with different orientation 161, 162 of the optical axis 16, in one case the optical path length OW in the retardation layer 101 increases with the angle $α_n$ and in the other case the optical path length OW in the retardation layer 121 decreases with the angle $α_n$.

Referring to FIG. 8, the following terms are given for the optical path length OW through the retardation layer 101:

for the beam 180 the optical path length $OW_{180}=d*n(\Theta)$ and for the beam 181 the optical path length $OW_{181}=d*n(\Theta+α_n)/\cos α_n$.

The optical path length OW through the retardation layer 121 for the beam 180 is $OW_{180}=d*n(\Theta)$ and for the beam 181 $OW_{181}=d*n(\Theta-α_n)/\cos α_n$.

This is a specific implementation of the principle already shown in FIG. 4 for using identical birefringent materials with different orientation of the optical axis. However, it is generally also possible to provide different birefringent materials for the retardation layers 101, 102; 121, 122; 9, 10, 11, 12.

Figure 9:
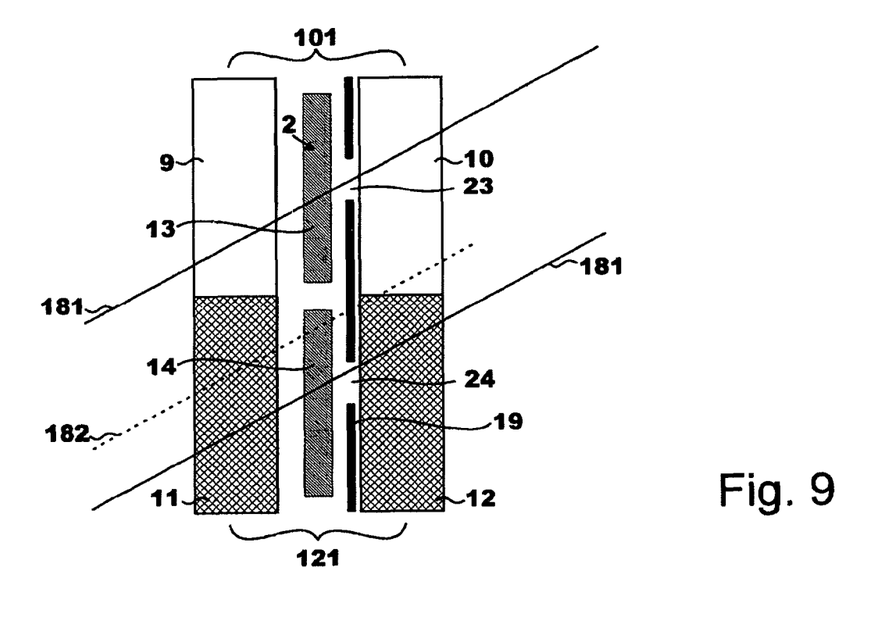
FIG. 9 shows schematically the division of the retardation layer into two sub-layers on both sides of an encoding surface in the form of a liquid crystal layer with inserted mask.

Referring to FIG. 9, in order to further reduce the layer thickness d of the retardation layers 101, 102; 121, 122, in the case of a transmissive modulator, the retardation layers 101, 121 can be split into two parts 9, 10 and 11, 12, respectively, which are disposed on the two planar sides of the liquid crystal layer 2.

An additional improvement can be achieved by an absorbing mask 19 which is disposed on the retardation layer 10, 12, said mask preventing the light beams 182 having linear polarisation from passing through two retardation layers 11, 10 which are of different nature and which are disposed opposing each other on either side of the encoding surface 2, if the light is incident at an oblique angle. The corresponding mask apertures 23, 24 are provided at positions where incident light beams 181 having linear polarisation can pass retardation layers 9, 10 and 11, 12 of same design in front of and/or behind the encoding surface 2. This is shown in FIG. 9. The mask 19 can therein be disposed between the retardation layers 10, 12 and the pixels 13, 14. The beam 182, which is drawn as an inclined line in FIG. 9, is absorbed by the mask 19.

The retardation layers 9, 10, 11, 12 are here disposed right next to the encoding surface, here the liquid crystal layer 2, i.e. inside the glass plates 7, 8 in a conventional display. The transition shown in FIG. 7 does then not take place directly between the retardation layer 101 and air, but at another position between the glass plate 7 or 8 and air.

The description based on the example of a transmission-type liquid crystal modulator also applies accordingly to other, initially mentioned types of modulators, where it must be considered that in a reflective modulator all layers are passed twice at different angles.

| List of reference numerals | |
|---|---|
| 1 | Light modulator |
| 2 | Encoding surface |
| 3 | First orientation layer |
| 4 | Second orientation layer |
| 5 | First electrode |
| 6 | Second electrode |
| 7 | First carrier layer |
| 8 | Second carrier layer |
| 9 | First retardation layer |
| 10 | Second retardation layer |
| 101 | Retardation layer |
| 102 | Retardation layer |
| 11 | Third retardation layer |
| 12 | Fourth retardation layer |
| 13 | First pixel |
| 131 | Pixel |
| 132 | Pixel |
| 14 | Second pixel |
| 141 | Pixel |
| 142 | Pixel |
| 15 | Pixel group |
| 151 | Pixel group |
| 152 | Pixel group |
| 16 | Optical axis |
| 161 | First orientation of the optical axis |
| 162 | Second orientation of the optical axis |
| 17 | Refractive index ellipsoid |
| 18 | Light beam |
| 180 | Light beam |
| 181 | Light beam |
| 182 | Absorbed light beam |
| 19 | Mask |
| 20 | First retardation |
| 21 | Second retardation |
| 22 | Retardation |
| 23 | Mask aperture |
| 24 | Mask aperture |
| Θ | Angle of a light beam relative to the optical axis |
| n | Refractive index |
| n1 | Ordinary refractive index |
| n2 | Extraordinary refractive index |
| α | Angle |
| $α_0$ | Reference angle |
| $α_n$ | Angle |
| d | Layer thickness of a retardation layer |

The invention claimed is:

1. Light modulator for representing complex-valued information, comprising an encoding surface and a certain structured retardation layer, where the encoding surface comprises an arrangement of pixels, whose transmissive or reflective phase shift can be controlled, where for encoding individual components of a complex number at least one given pixel of a pixel group of adjacent pixels of the encoding surface is assigned with the certain structured retardation layer, which causes an angle-specific change in an optical path length of an incident bundle of rays having linear polarisation, the angle-specific change relating to an angle between an exiting bundle of rays and the encoding surface, wherein the layer thickness of the retardation layer is dimensioned such that when encoding the individual components of a complex number the change in the optical path length through the retardation layer counteracts the angle-specific change in the retardation among individual pixels of the pixel group, and compensates the angle-specific change in the retardation at least partly or even entirely.

2. Light modulator according to claim 1, wherein the certain structured retardation layer is disposed near the encoding surface, where the retardation layer can be disposed either in front of and/or behind the encoding surface, preferably in close contact with the pixels.

3. Light modulator according to claim 1, wherein pixels are arranged one-dimensionally or are arranged one-dimensionally in a stripe-shaped manner, or two-dimensionally, related to the encoding surface.

4. Light modulator according to claim 1, wherein the encoding surface or a carrier layer being in contact with the encoding surface is designed either as a flexible or as an inelastic layer.

5. Light modulator according to claim 1, wherein the encoding surface which comprises the arrangement of the pixels is in contact with at least one carrier layer or with at least one orientation layer which is disposed on at least one side of the encoding surface.

6. Light modulator according to claim 5, wherein the encoding surface is a plane liquid crystal layer or wherein the encoding surface of the light modulators comprises an arrangement of micro-fluidic droplet pixels which can be manipulated by an electric field, where the light modulator is designed in the form of an electro-wetting phase-modulating light modulator.

7. Light modulator according to claim 1, wherein the encoding surface which comprises the arrangement of the pixels is assigned to at least one switching element layer or to at least one switching element layer being an electrode layer which is disposed on both sides of the encoding surface for controlling the pixels.

8. Light modulator according to claim 1, wherein the retardation layer is disposed between an electrode and a carrier layer, on the inside face of the carrier layer or on the outside face of the carrier layer.

9. Light modulator according to claim 1, comprising
The encoding surface which comprises the arrangement of pixels,
Optionally one orientation layer, which is disposed on at least one of the two sides of the encoding surface,
At least one electrode layer for controlling the pixels which is disposed on the two free sides, and
At least one carrier layer which is disposed on at least one of the two free sides,
thus providing a one- or two-dimensional arrangement of pixels, which can be controlled with the help of the potentials which are supplied to the electrode layers, and where a structured retardation layer is disposed between at least one of the electrode layers and the carrier layer which is adjacent to the electrode layer.

10. Light modulator according to claim 1, wherein the certain structured retardation layers are disposed between electrode layers and carrier layers on both sides of the plane encoding surface.

11. Light modulator according to claim 1, wherein, for controlling the encoding surface, electrodes and orientation layers for controlling and orienting the pixels are disposed on the side of the retardation layers which faces the encoding surface.

12. Light modulator according to claim 1, wherein a mask is situated between one electrode and the retardation layers on the side through which the light beams are emitted after having passed the pixels, said mask having a structure which prevents the light beams having linear polarisation from passing through two retardation layers which are of different nature and which are disposed opposing each other on either side of the encoding surface, if the light is incident at an oblique angle, and where corresponding mask apertures are provided at positions where incident light beams having linear polarisation pass retardation layers and of same design in front of and/or behind the encoding surface.

13. Light modulator according to claim 1, wherein the structure width of the structured retardation layers largely corresponds to an extent of a pixel group, which comprises multiple pixels.

14. Light modulator according to claim 1, wherein with a two-phase encoding method where two adjacent pixel columns are used in order to encode a complex number in each row, the structured retardation layers exhibit a column arrangement of a size which corresponds roughly to the dimensions of the pixels.

15. Light modulator according to claim 1, wherein the structured retardation layers are structured layers made of a single birefringent material or a combination of multiple birefringent materials, where only an extraordinary beam passes through the retardation layer because of an use of polarised light beams, and where birefringent materials exhibit angle-specific changes in the refractive index and thus cause changes in the optical path lengths of light transmitted at different angles.

16. Light modulator according to claim 1, wherein the retardation layer which respectively follows the pixels causes light beams with an oblique angle of incidence to cover different optical path lengths for an angle through the pixels which are separated by one pixel such that the retardation to the adjacent pixels is compensated partly or even entirely.

17. Light modulator according to claim 1, wherein the light beams which are transmitted through the retardation layer have linear polarisation, where the retardation is achieved when only an extraordinary beam passes through the retardation layer, where the linear polarisation is obtained by using a light source which only emits polarised light, or by disposing the linear polariser on the entry side of the light modulator.

18. Light modulator according to claim 1, wherein the change in the optical path length for an angle is relative to a given reference angle, where the differences in optical path length for this reference angle are compensated by writing modified phase values to one of the two pixels of a group.

19. Light modulator according to claim 1, wherein two different retardation layers are disposed in front of the two adjacent pixels of the groups, where light beams emitted by one pixel of the group cover a longer optical path length relative to a reference angle, than light beams emitted by the other pixel, which cover a shorter optical path length relative to the reference angle, because the retardation layers exhibit properties which differ from those of the retardation layers.

20. Light modulator according to claim 1, wherein an identical birefringent material, but with different orientation of an optical axis, can be used for an adjacent retardation layer to the retardation layer, such that in one case the optical path length in the one retardation layer increases with an angle and in the other case the optical path length in the adjacent retardation layer decreases with the angle, or vice versa.

21. Light modulator according to claim 1, wherein the retardation layer is made of different birefringent materials.

22. Light modulator according to claim 1, wherein the retardation layers which are disposed on only one side are split into two-piece retardation layers, which are disposed on both planer sides of the encoding surface in order to minimise the layer thickness.

23. Light modulator according to claim 1, wherein the retardation layers are disposed right next to the encoding surface, inside the glass plates or outside thereof.

24. Light modulator according to claim 1, wherein the structured retardation layers are provided when using a micro-mirror array, in particular a tip-mirror array for phase modulation, which represents the arrangement of pixels, where the structured retardation layers are alternately applied on adjacent columns of micro-mirrors of the micro-mirror array.

* * * * *